United States Patent
Satoh et al.

(10) Patent No.: US 10,103,575 B2
(45) Date of Patent: Oct. 16, 2018

(54) POWER INTERCHANGE MANAGEMENT SYSTEM AND POWER INTERCHANGE MANAGEMENT METHOD FOR MAINTAINING A BALANCE BETWEEN POWER SUPPLY AND DEMAND

(71) Applicant: HITACHI, LTD., Tokyo (JP)

(72) Inventors: Hiroki Satoh, Tokyo (JP); Takaharu Ishida, Tokyo (JP)

(73) Assignee: HITACHI, LTD., Tokyo (JP)

( * ) Notice: Subject to any disclaimer, the term of this patent is extended or adjusted under 35 U.S.C. 154(b) by 172 days.

(21) Appl. No.: 15/115,744

(22) PCT Filed: Feb. 13, 2014

(86) PCT No.: PCT/JP2014/053273
§ 371 (c)(1),
(2) Date: Aug. 1, 2016

(87) PCT Pub. No.: WO2015/121937
PCT Pub. Date: Aug. 20, 2015

(65) Prior Publication Data
US 2017/0012467 A1    Jan. 12, 2017

(51) Int. Cl.
*G05D 17/00* (2006.01)
*H02J 13/00* (2006.01)
(Continued)

(52) U.S. Cl.
CPC .............. *H02J 13/00* (2013.01); *G05B 15/02* (2013.01); *H02J 3/005* (2013.01); *H02J 3/06* (2013.01);
(Continued)

(58) Field of Classification Search
None
See application file for complete search history.

(56) References Cited

U.S. PATENT DOCUMENTS

| | | | |
|---|---|---|---|
| 2010/0320838 A1 | 12/2010 | Massie et al. | |
| 2011/0088748 A1* | 4/2011 | Lee | H02J 3/1814 136/244 |

(Continued)

FOREIGN PATENT DOCUMENTS

| | | |
|---|---|---|
| JP | 2004-015882 A | 1/2004 |
| JP | 2008-061334 A | 3/2008 |

(Continued)

OTHER PUBLICATIONS

International Search Report, dated May 20, 2014, which issued during the prosecution of International Application No. PCT/JP2014/053273, which corresponds to the present application.

*Primary Examiner* — Wissam Rashad
(74) *Attorney, Agent, or Firm* — Baker Botts L.L.P.

(57) ABSTRACT

A communicating unit 113 of a power interchange management system 101 is coupled to a plurality of power interchange apparatuses 102 that control electrical equipment 131 to 133. Each power interchange apparatus is coupled via a system power supply line 160. A computing unit 117 creates a group for interchanging power by acquiring prescribed pieces of information 126 to 128 from the respective power interchange apparatuses and selecting a plurality of prescribed power interchange apparatuses based on the prescribed pieces of information. Prescribed conditions include a condition related to control power. The condition related to control power may be that a first power interchange apparatus on a power transmitting side has power for power transmission control necessary for transmitting power and, at the same time, a second power interchange apparatus on a power receiving side has power for power reception control necessary for receiving power.

11 Claims, 15 Drawing Sheets

(51) Int. Cl.
  *H02J 3/06*   (2006.01)
  *H02J 3/46*   (2006.01)
  *H02J 3/00*   (2006.01)
  *G05B 15/02*  (2006.01)
  *H02J 3/38*   (2006.01)

(52) U.S. Cl.
  CPC .............. *H02J 3/383* (2013.01); *H02J 3/386* (2013.01); *H02J 3/46* (2013.01); *H02J 13/0006* (2013.01); *H02J 3/382* (2013.01); *Y02B 70/3216* (2013.01); *Y04S 20/221* (2013.01)

(56) References Cited

U.S. PATENT DOCUMENTS

| | | |
|---|---|---|
| 2012/0173035 A1 | 7/2012 | Abe |
| 2012/0233060 A1 | 9/2012 | Terano et al. |
| 2013/0311000 A1* | 11/2013 | Kudo ....................... H02J 3/46 700/296 |

FOREIGN PATENT DOCUMENTS

| | | |
|---|---|---|
| JP | 2011-061970 A | 3/2011 |
| WO | WO 2010/148181 A2 | 12/2010 |
| WO | WO 2011/055208 A1 | 5/2011 |
| WO | WO 2012/105105 A1 | 8/2012 |

* cited by examiner

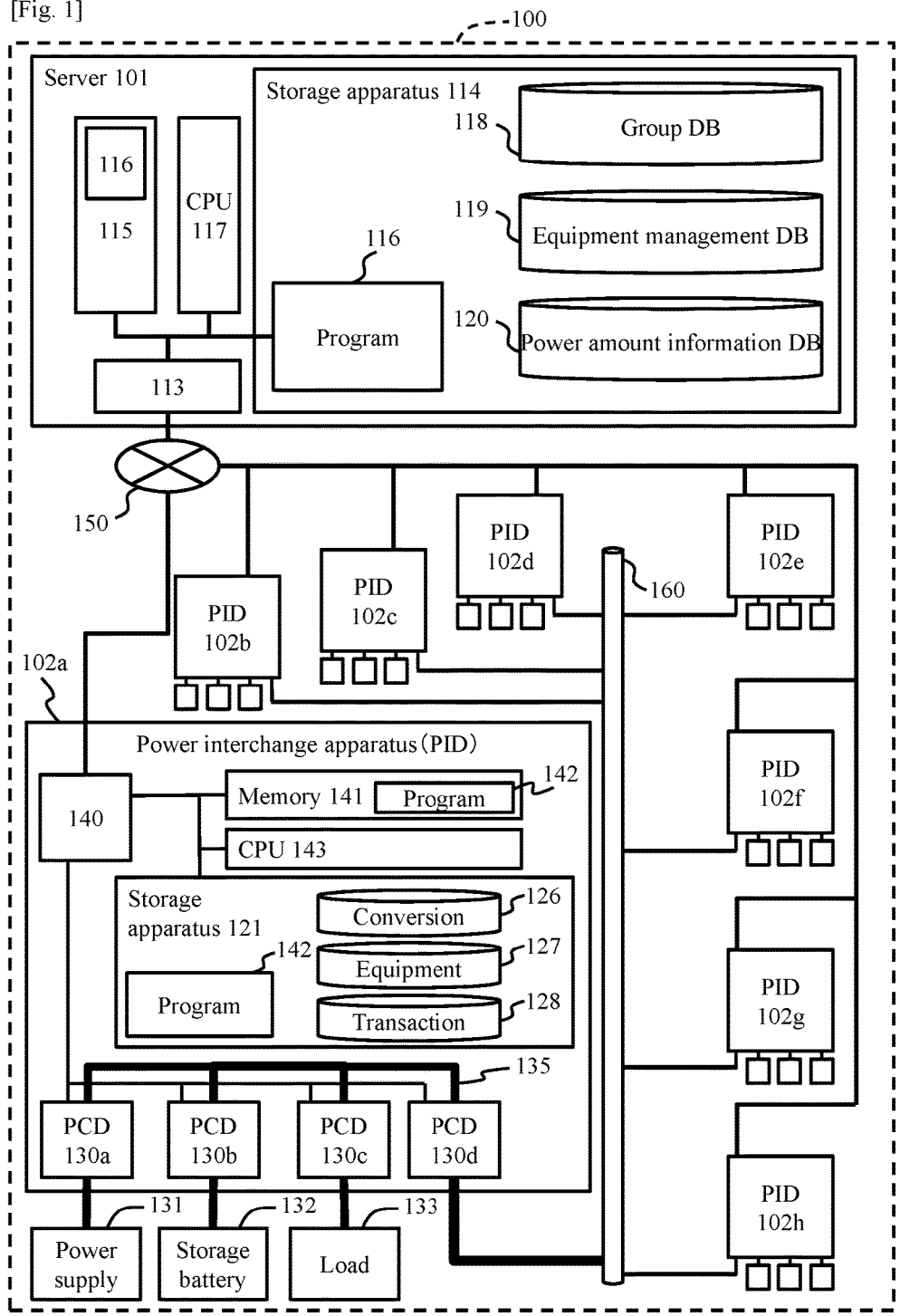
[Fig. 1]

[Fig. 2]

| Period | Group 1 | Group 2 | ... | Group N |
|---|---|---|---|---|
| 12/01/01 - 12/01/31 | PID102a, PID102b | PID102c, PID102d | ... | PID102g, PID102h |
| 12/02/01 - 12/02/29 | PID102a, PID102c | PID102b, PID102d | ... | PID102e, PID102g |
| ... | ... | ... | ... | ... |
| 12/03/01 - 12/03/31 | PID102h | PID102a, PID102f | ... | PID102b |

[Fig. 3]

| | Period | Maximum amount of generated power (302) | Maximum amount of stored power (303) | Maximum load amount (304) | Installation location (305) | Transfer feasibility (306) |
|---|---|---|---|---|---|---|
| 311 PID 102a | 12/01/01 - 12/02/01 | 10 | 10 | 5 | 00.41.21.55 | Feasible |
| 312 PID 102b | 12/01/01 - 12/02/01 | 5 | 5 | 10 | 11.213.11.44 | Feasible |
| ... | ... | ... | ... | ... | | |
| 313 PID 102h | 12/01/01 - 12/02/01 | 30 | 15 | 0 | 99.87.21.46 | Feasible |

[Fig. 4]

|  | Period 401 | Amount of supplied power 402 | Amount of received power 403 | Cost for supplying power 404 | Cost for receiving power 405 |
|---|---|---|---|---|---|
| PID 102a | 12/01/01 - 12/02/01 | 10 | 10 | 5 | 5 |
| PID 102b | 12/01/01 - 12/02/01 | 5 | 5 | 10 | 5 |
| ... | ... | ... | ... | ... |  |
| PID 102h | 12/01/01 - 12/02/01 | 30 | 15 | 0 | 7 |

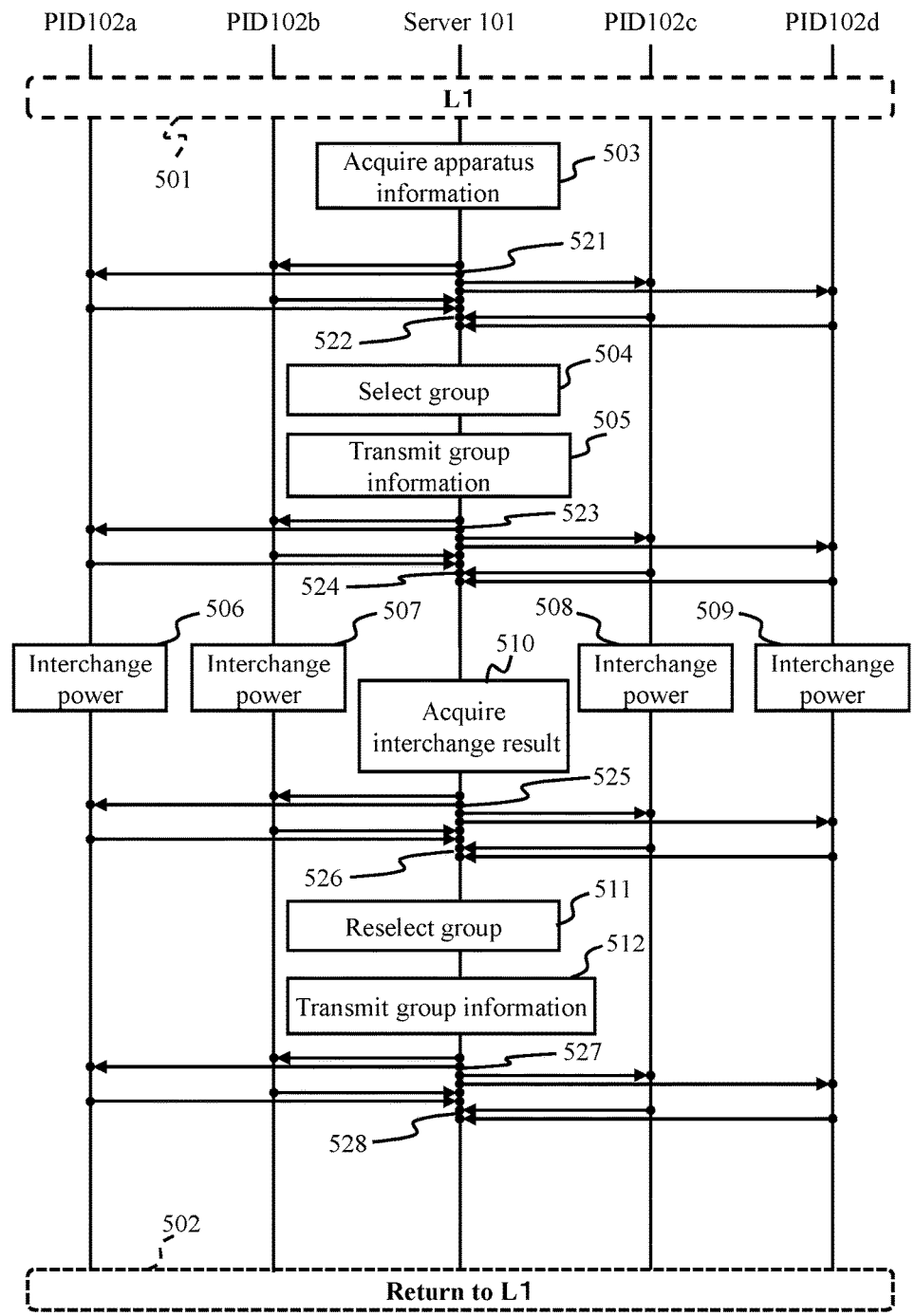

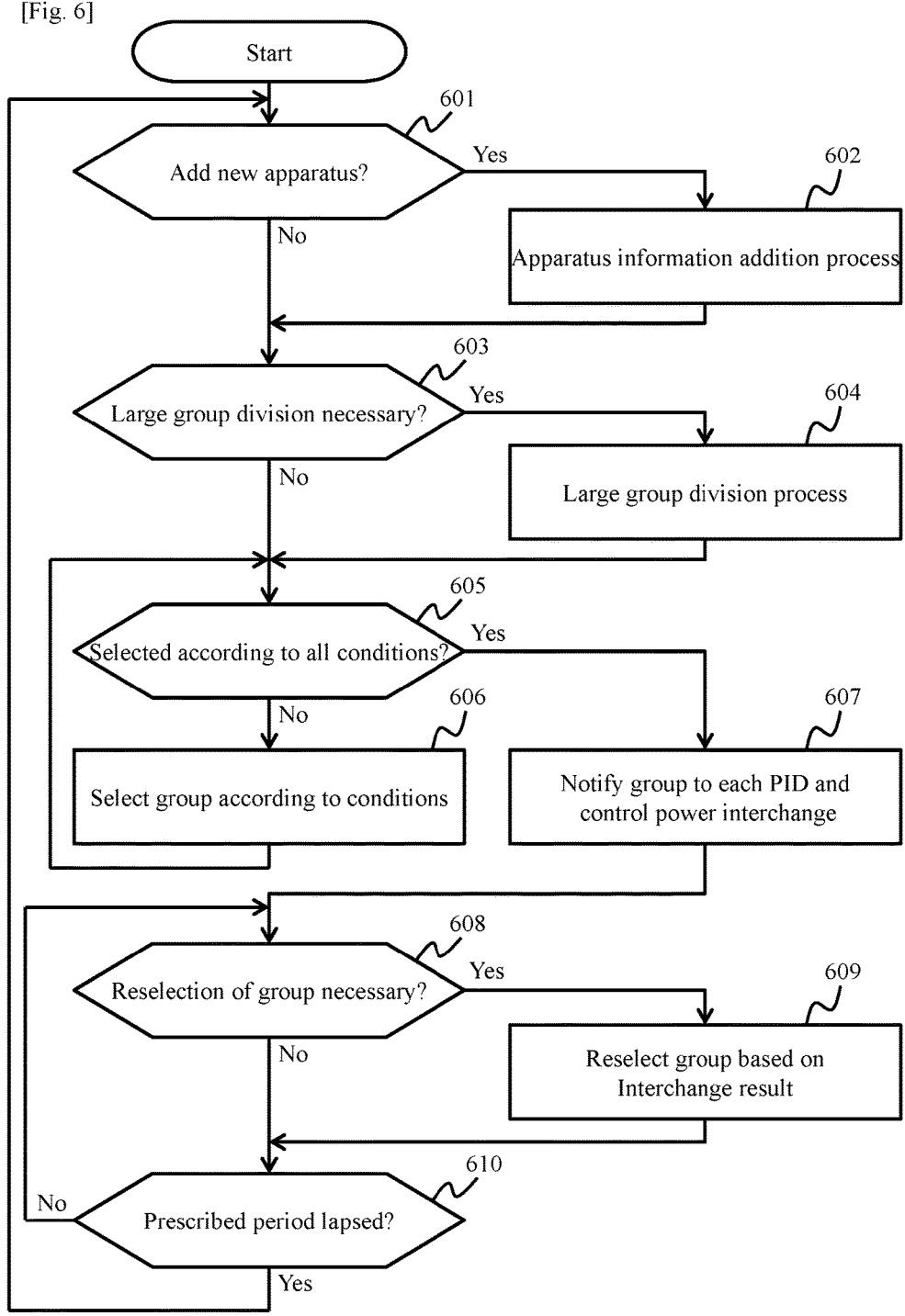
[Fig. 6]

[Fig. 7]
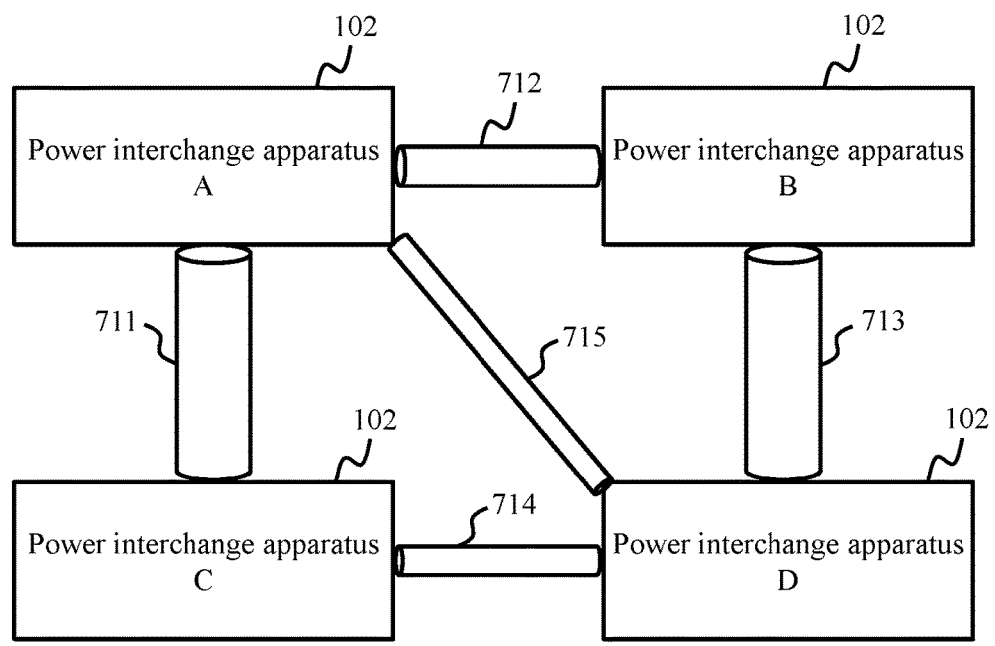

[Fig. 8]

|  | PID A | PID B | PID C | PID D |
|---|---|---|---|---|
| PID A | - | 5 | 10 | 1 |
| PID B | 5 | - | 0 | 10 |
| PID C | 10 | 0 | - | 3 |
| PID D | 1 | 10 | 3 | - |

[Fig. 9]

|  | Amount of generated power (901) | Amount of stored power (902) | Load amount (903) | Basic interchange amount (904) | Maximum interchange amount (905) |
|---|---|---|---|---|---|
| PID A (911) | 10 | 3 | 5 | +5 | +8 |
| PID B (912) | 10 | 3 | 8 | +2 | +5 |
| PID C (913) | 6 | 4 | 14 | −8 | −4 |
| PID D (914) | 2 | 10 | 4 | −2 | +8 |

[Fig. 10]

| | Group 1 | Group 2 | Group 3 | Group 4 |
|---|---|---|---|---|
| Pattern 1 | PID ABCD | N/A | N/A | N/A |
| Pattern 2 | PID A | PID BCD | N/A | N/A |
| Pattern 3 | PID B | PID ACD | N/A | N/A |
| Pattern 4 | PID C | PID ABD | N/A | N/A |
| Pattern 5 | PID D | PID ABC | N/A | N/A |
| Pattern 6 | PID AB | PID CD | N/A | N/A |
| Pattern 7 | PID AB | PID C | PID D | N/A |
| Pattern 8 | PID AC | PID BD | N/A | N/A |
| Pattern 9 | PID AC | PID B | PID D | N/A |
| Pattern 10 | PID AD | PID BC | N/A | N/A |
| Pattern 11 | PID AD | PID B | PID C | N/A |
| Pattern 12 | PID BC | PID A | PID D | N/A |
| Pattern 13 | PID BD | PID A | PID C | N/A |
| Pattern 14 | PID CD | PID A | PID B | N/A |
| Pattern 15 | PID A | PID B | PID C | PID D |

[Fig. 11]

| | Initial state | Condition 1 | Condition 2 | Condition 3 | Condition 4 |
|---|---|---|---|---|---|
| Policy details | - | Physical interchange feasibility | Stable supply feasibility | Interconnection line capacity determination | Smoothed device use |
| Pattern 1 | Valid | Valid | Valid | Valid | Valid |
| Pattern 2 | Valid | Valid | Valid | Invalid | Invalid |
| Pattern 3 | Valid | Valid | Valid | Valid | Valid |
| Pattern 4 | Valid | Valid | Invalid | Invalid | Invalid |
| Pattern 5 | Valid | Valid | Valid | Valid | Invalid |
| Pattern 6 | Valid | Valid | Valid | Valid | Invalid |
| Pattern 7 | Valid | Valid | Invalid | Invalid | Invalid |
| Pattern 8 | Valid | Valid | Valid | Valid | Valid |
| Pattern 9 | Valid | Valid | Valid | Valid | Invalid |
| Pattern 10 | Valid | Invalid | Invalid | Invalid | Invalid |
| Pattern 11 | Valid | Valid | Invalid | Invalid | Invalid |
| Pattern 12 | Valid | Invalid | Invalid | Invalid | Invalid |
| Pattern 13 | Valid | Valid | Valid | Invalid | Invalid |
| Pattern 14 | Valid | Valid | Valid | Invalid | Invalid |
| Pattern 15 | Valid | Valid | Invalid | Invalid | Invalid |

[Fig. 12]
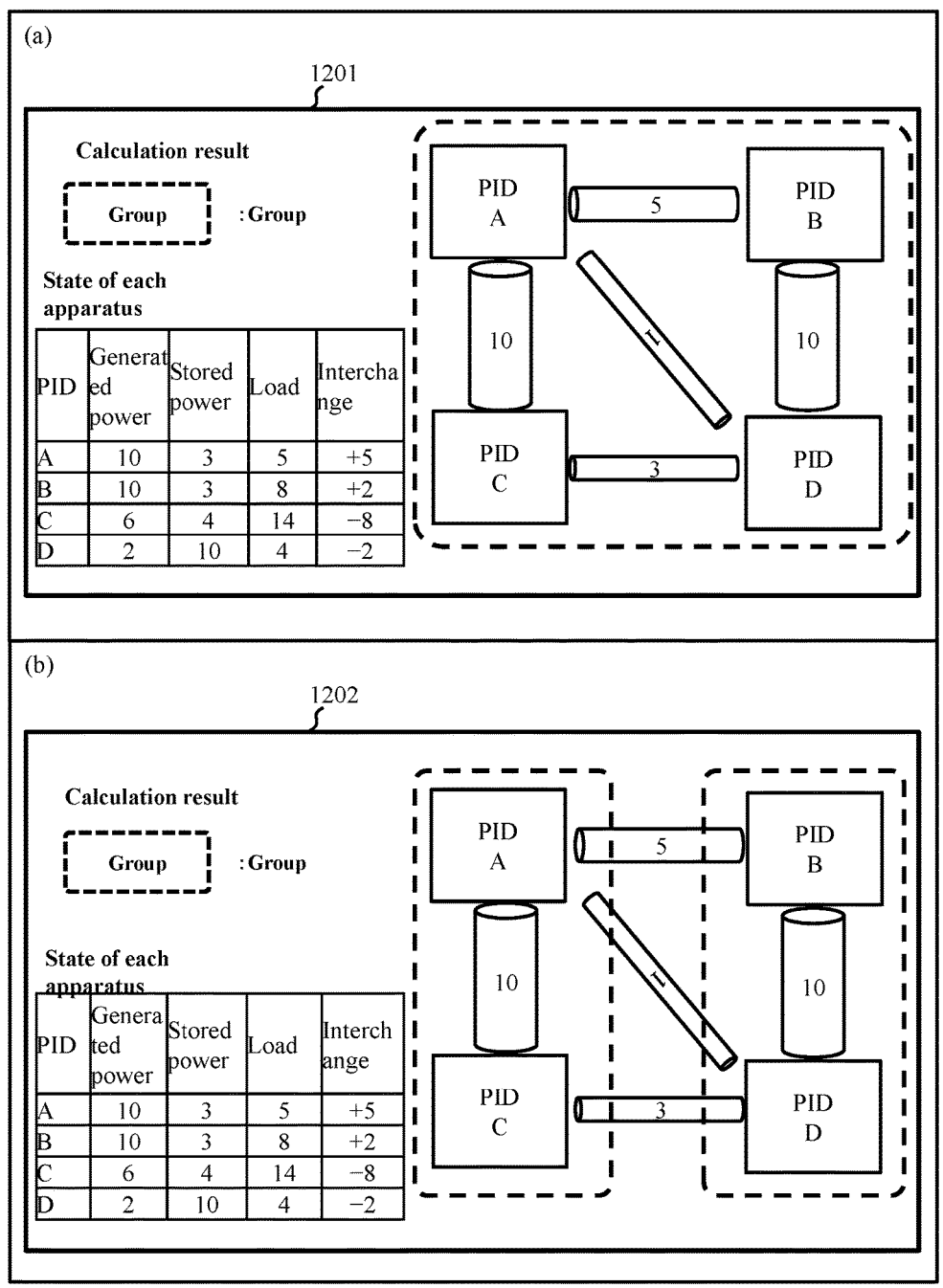

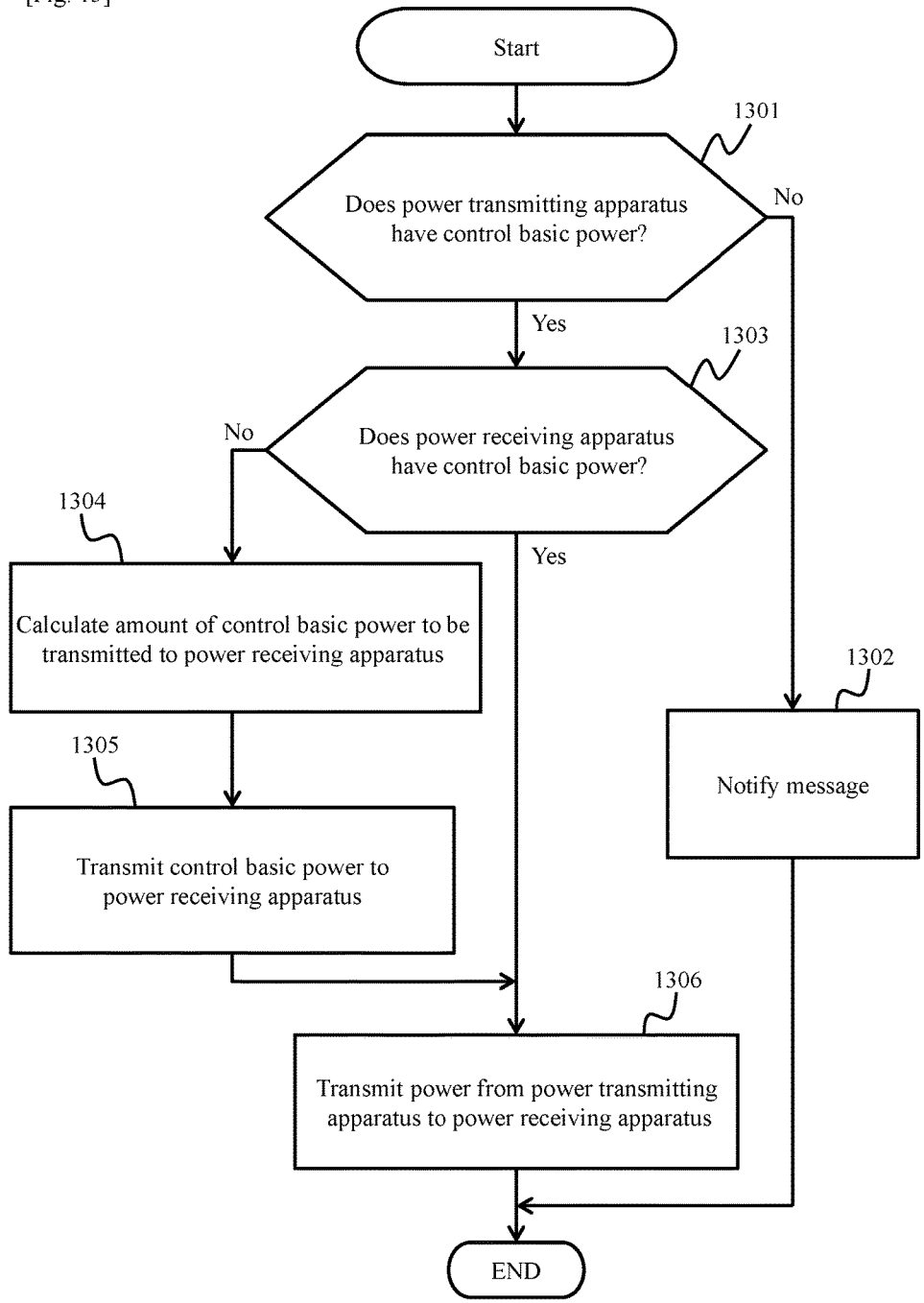
[Fig. 13]

[Fig. 14]
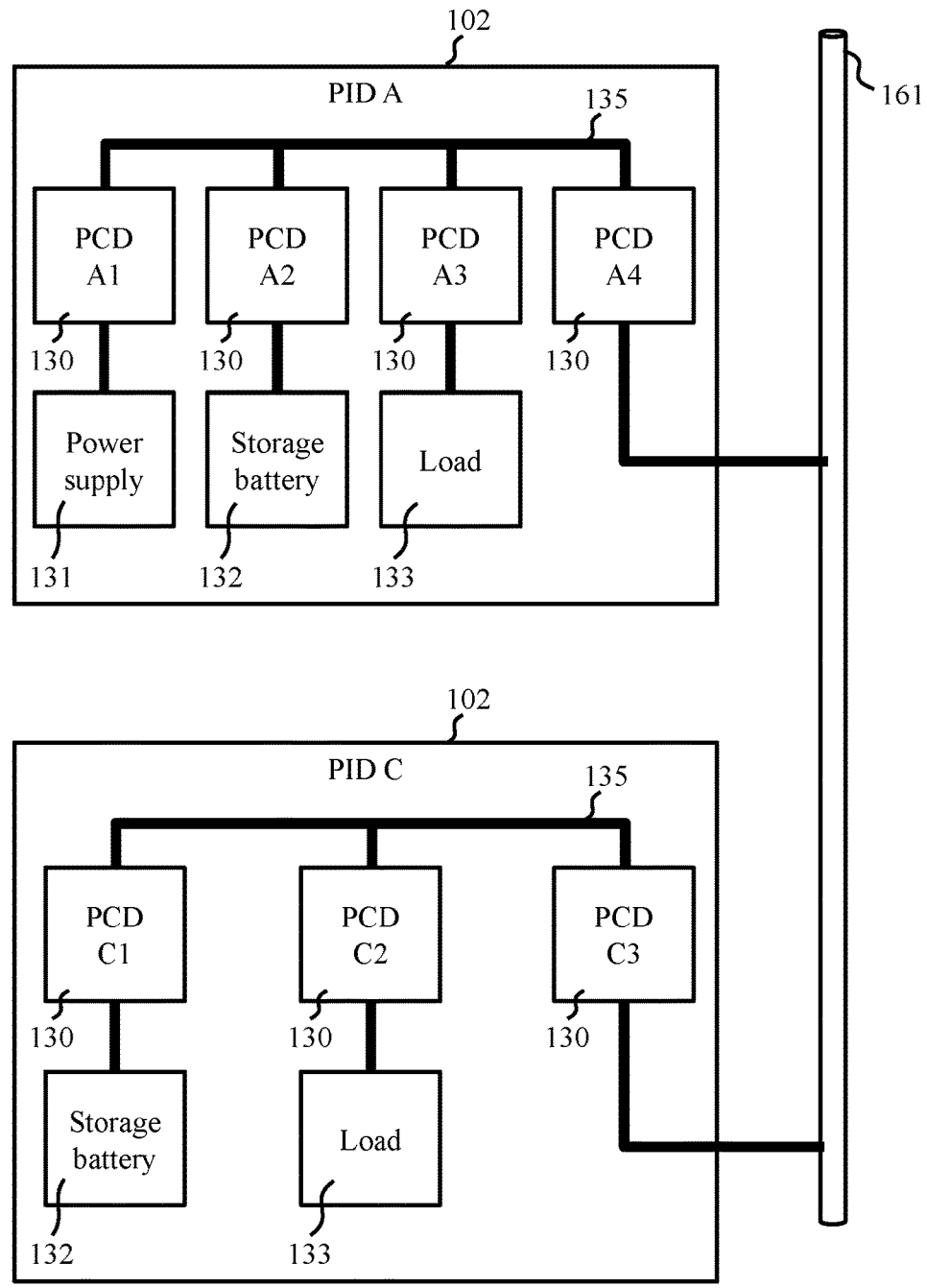

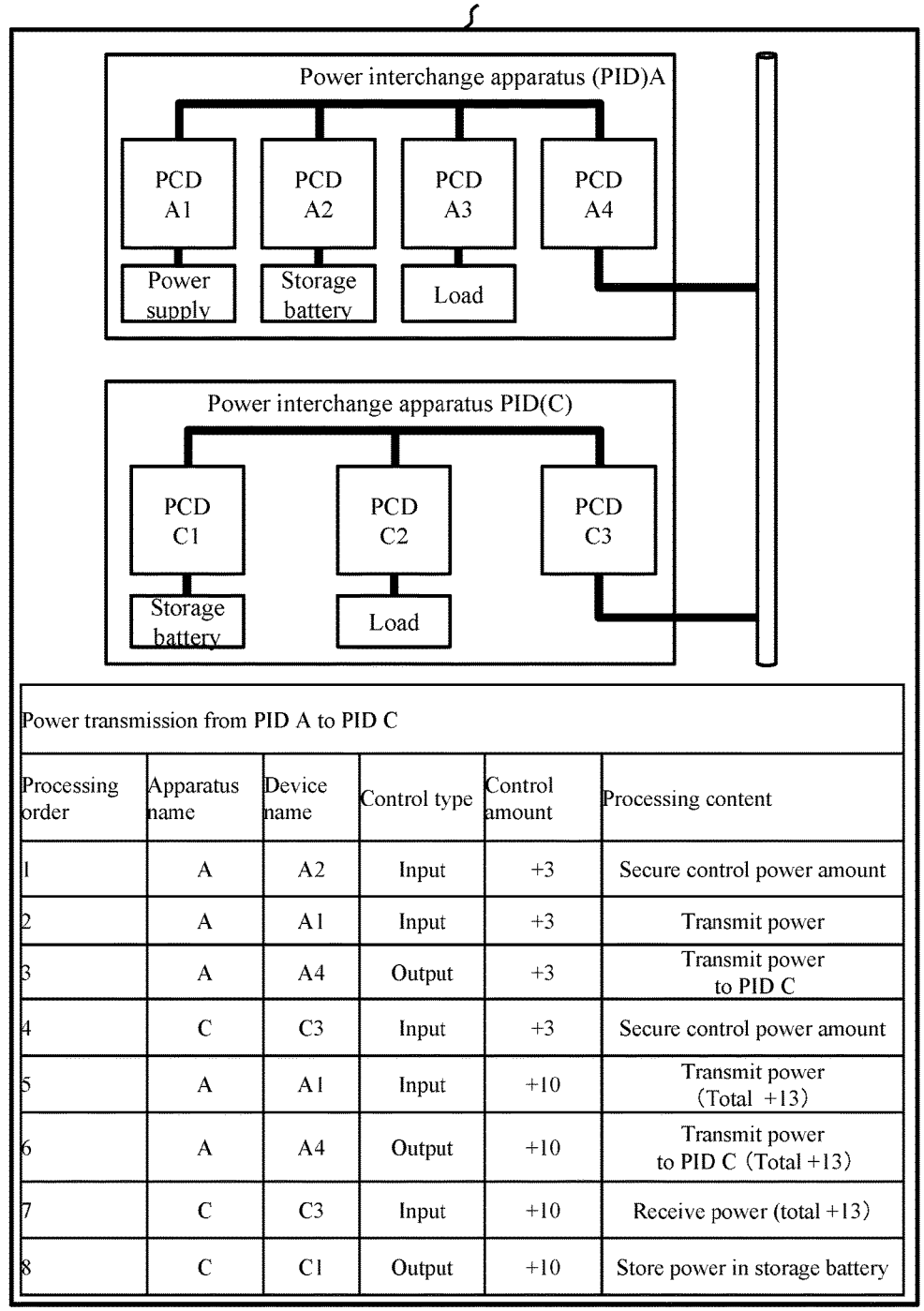
[Fig. 15]

POWER INTERCHANGE MANAGEMENT SYSTEM AND POWER INTERCHANGE MANAGEMENT METHOD FOR MAINTAINING A BALANCE BETWEEN POWER SUPPLY AND DEMAND

CROSS REFERENCE TO PRIOR APPLICATIONS

This application is a U.S. National Phase application under 35 U.S.C. § 371 of International Application No. PCT/JP2014/053273, filed on Feb. 13, 2014. The International Application was published in Japanese on Aug. 20, 2015 as WO 2015/121937 A1 under PCT Article 21(2). The contents of the above applications are hereby incorporated by reference.

TECHNICAL FIELD

The present invention relates to a power interchange management system and a power interchange management method.

BACKGROUND ART

Today, there are growing expectations for stable supply of power. In addition, distributed power supplies such as photovoltaic power generation and wind power generation as well as storage batteries are gaining popularity. Furthermore, it appears more likely that so-called separation of power generation from power transmission and distribution in which different business operators respectively perform power transmission and power distribution is to be implemented.

Accordingly, there are signs of a beginning of a change from a conventional configuration where power is supplied from a large-scale power plant to equipment of end consumers by a treelike power transmission and distribution grid to a locally-produced and locally-consumed power supply-demand system where power is respectively generated in each area and the generated power is consumed in that area.

A technique using a multi-terminal asynchronous linking apparatus (refer to PTL 1) is proposed as means for constructing a locally-produced and locally-consumed supply-demand system. The conventional technique involves forming small power transmission grids using coupling apparatuses capable of converting alternating current into direct current and converting direct current into alternating current and transferring power among the small power transmission grids.

CITATION LIST

Patent Literature

[PTL 1]
Japanese Patent Application Laid-open No. 2011-061970

SUMMARY OF INVENTION

Technical Problem

Power transfer has several conceivable objects. For example, one object is to create an environment where power meeting a certain level of quality can always be used. Favorably, an environment is in place where power meeting a certain level of quality can always be used even when a disaster strikes, when there is an excessive demand for power, and when distributed power supplies that are unstable and non-uniform are responsible for a majority of power generation.

In order to use power meeting a certain level of quality as described above, a balance of supply and demand must always be kept constant in one power supply-demand system.

However, PTL 1 only discloses transfer of power in accordance with a supply request or a demand request and does not take maintaining a balance of demand and supply in one power supply-demand system into consideration.

In addition, there is no disclosure regarding maintaining a supply-demand balance of power within a group of power supply-demand systems. Furthermore, no consideration is given to whether basic conditions regarding a feasibility of transferring power in the group are satisfied or not.

In consideration thereof, an object of the present invention is to provide a power interchange management system and a power interchange management method configured so that power can be interchanged while maintaining a balance of supply and demand. In addition, another object of the present invention is to provide a power interchange management system and a power interchange management method configured so that power can be interchanged within a grouped range. Yet another object of the present invention is to provide a power interchange management system and a power interchange management method configured to be capable of creating a group which interchanges power by checking, in advance, whether or not a power-transmitting power interchange apparatus and a power-receiving power interchange apparatus are respectively provided with control power necessary for transmitting power and receiving power.

Solution to Problem

A power interchange management system according to an aspect of the present invention is a power interchange management system which manages power interchange, the power interchange management system including a communicating unit, a storage unit, and a computing unit that is coupled to the communicating unit and the storage unit, wherein the communicating unit is coupled via a communication network to a plurality of power interchange apparatuses each controlling a power supply-demand state of electrical equipment under management of the power interchange apparatus, and the respective power interchange apparatuses are electrically coupled via a system power supply line, and the computing unit is configured to execute a prescribed computer program in order to: acquire prescribed information from each power interchange apparatus via the communicating unit; store each piece of acquired prescribed information in the storage unit; and create a group for interchanging power by selecting a plurality of prescribed power interchange apparatuses from the respective power interchange apparatuses based on the prescribed information stored in the storage unit.

The prescribed information may include configuration information related to a configuration of each power interchange apparatus and to electric coupling among the respective power interchange apparatuses, and power supply-demand state information related to a power supply-demand state of each power interchange apparatus, and the computing unit may be configured to select a plurality of prescribed power interchange apparatuses and form the group based on the respective pieces of configuration information and the respective pieces of power supply-demand state information and on prescribed conditions that are configured in advance.

The prescribed conditions may include a condition related to control power, and the condition related to control power may be that, among the plurality of prescribed power interchange apparatuses included in a group, the first power interchange apparatus on a power transmitting side in the group has power for power transmission control necessary for transmitting power and, at the same time, a second power interchange apparatus on a power receiving side in the group has power for power reception control necessary for receiving power.

Advantageous Effects of Invention

According to the present invention, by selecting prescribed power interchange apparatuses based on prescribed information acquired from respective power interchange apparatuses, a group for interchanging power can be created. In addition, according to the present invention, a group is created when a first power interchange apparatus has power for power transmission control and, at the same time, a second power interchange apparatus has power for power reception control. Therefore, an occurrence of a phenomenon where power interchange cannot be performed due to a shortage of basic power necessary for power transfer can be suppressed and usability can be improved.

BRIEF DESCRIPTION OF DRAWINGS

FIG. 1 is a diagram showing a configuration example of a power interchange network system.
FIG. 2 is a diagram showing an example of a group database.
FIG. 3 is a diagram showing examples of an equipment management database and equipment information.
FIG. 4 is a diagram showing examples of a power amount information database and transaction information.
FIG. 5 is a flow chart showing a processing example of a control method of a server and a power interchange apparatus.
FIG. 6 is a flow chart showing processing of a control method of a server.
FIG. 7 is a diagram showing examples of a physically transmittable power amount and a physically transmittable power path between power interchange apparatuses.
FIG. 8 is a diagram showing examples of a transmittable power amount between power interchange apparatuses.
FIG. 9 is a diagram showing items necessary for power interchange and examples of values thereof.
FIG. 10 is a diagram showing examples of groups that can be calculated.
FIG. 11 is a diagram showing an example of a result of selecting groups based on conditions.
FIG. 12 is an image of a screen showing a result of selecting groups based on conditions.
FIG. 13 is a flow chart of a process of controlling transfer of power in consideration of a basic power amount for control.
FIG. 14 is a diagram showing a configuration example of two power interchange apparatuses performing power transfer control.
FIG. 15 is an image of a screen displaying a result of a process of controlling power transfer.

DESCRIPTION OF EMBODIMENTS

A present embodiment will now be described with reference to the drawings. It should be noted that the examples described below are not intended to limit the invention as set forth in the accompanying claims and that all of the elements and combinations thereof described in the examples are not necessarily essential to solutions proposed by the invention. Hereinafter, power demand may be simply described as demand and power supply may be simply described as supply.

A supply-demand balance of power can be kept constant by equalizing a plurality of different demands and supplies. As far as demand is concerned, a necessary power amount and a time slot of power use differ from one consumer to the next. A same description applies for supply, where a power amount that can be generated and a time slot during which power can be generated differ from one supplier to the next. In addition, each consumer has a different power storage capability.

Therefore, by appropriately grouping these suppliers and consumers having mutually different characteristics and capabilities in accordance with prescribed conditions, supply and demand in a group can be equalized and a supply-demand balance can be kept constant.

For example, prescribed conditions are configured in advance in accordance with an object such as realization of stable supply and demand of power, smoothing of use of electrical equipment (power supplies, storage batteries, and loads), ensuring that capacities of power transmission lines are sufficient, and achieving lower cost. A group is created by extracting power interchange apparatuses satisfying the prescribed conditions and power interchange (power transfer) is performed within the group.

A power interchange apparatus possesses, for example, a policy for interchanging power, equipment information, control information, and transaction information. A management server acquires the information from power interchange apparatuses to create a database, and creates a group based on contents of the database.

In order to transfer power within a group in consideration of a supply-demand balance, whether or not a side that supplies power and a side that receives and consumes the power respectively have control power for controlling power transfer must be evaluated in advance. This is because power transfer cannot be performed in a case where both a power transmitting-side power interchange apparatus and a power receiving-side power interchange apparatus do not have control power even when the power interchange apparatuses satisfy all other conditions.

In the present embodiment, even in a case where a power receiving-side power interchange apparatus does not have control power, when a power transmitting-side power interchange apparatus has sufficient power, control power is first transmitted before supplying power from the power transmitting-side to the power receiving-side. Accordingly, the power receiving-side power interchange apparatus can receive power from the power transmitting-side power interchange apparatus and distribute the power to electrical equipment under its management.

EXAMPLE 1

—System Configuration—

Hereinafter, an embodiment of the present invention will be described in detail with reference to the drawings.

FIG. 1 shows a configuration example of a power interchange network system 100 according to the present embodiment. The power interchange network system 100 (hereinafter, the system 100) shown in FIG. 1 interchanges power among respective power interchange apparatuses 102 in a power interchange network.

The system 100 includes a management server 101 as an example of a "power interchange management system" or a "management apparatus" and a plurality of power interchange apparatuses 102 that are managed by the management server 101, and the management server 101 and the respective power interchange apparatuses 102 are coupled via a communication network 150 so as to be capable of communication.

In the system 100, at least one group including at least one power interchange apparatus 102 is created based on arbitrary conditions (to be described later). The power interchange apparatuses 102 constituting a group are not fixed and can be dynamically changed in accordance with a power supply-demand status or the like. The system 100 is a computer system for controlling power interchange among the power interchange apparatuses 102 in each group.

The system 100 shown in FIG. 1 includes a plurality of power interchange apparatuses 102a to 102h which are coupled to a system power supply line 160 and the management server 101 which is coupled to the power interchange apparatuses 102a to 102h via the communication network 150 so as to be capable of communication. Accordingly, a power interchange network is constructed in which power can be mutually interchanged among the power interchange apparatuses as necessary.

When not distinguishing among individual power interchange apparatuses, the power interchange apparatuses 102a to 102h will be referred to as a power interchange apparatus 102 or an apparatus 102. In the drawings, a power interchange apparatus will be abbreviated to "PID".

The power interchange apparatus 102 is configured as a multi-terminal asynchronous linking apparatus. For example, the apparatus 102 is coupled via a power line 135 to one or more electrical equipment such as a power supply 131, a storage battery 132, and a load 133. The power line 135 is an example of a "shared power line".

Electrical equipment of one apparatus 102 and electrical equipment of another apparatus 102 may be of a same type or maybe of different types. For example, the one apparatus 102 may manage the power supply 131, the storage battery 132, and the load 133 while the other apparatus 102 may only manage the storage battery 132 and the load 133.

A hardware configuration of the apparatus 102 is as follows. For example, the apparatus 102 includes a storage apparatus 121, a communication device control unit 140, an internal memory 141, a central processing unit (hereinafter, a CPU) 143, and power converters 130a to 130d. When not particularly distinguishing among the power converters 130a to 130d, the power converters 130a to 130d will be referred to as a power converter 130. In the drawings, a power converter will be abbreviated to "PCD".

The storage apparatus 121 is configured as, for example, a non-volatile storage apparatus such as a hard disk drive or a flash memory device. The storage apparatus 121 stores a computer program 142 for realizing prescribed functions to be provided in the apparatus 102, conversion information 126, equipment information 127, and transaction information 128.

The communication device control unit 140 communicates with other apparatuses 102 and the management server 101 via the communication network 150 and communicates with the power converter 130. The internal memory 141 is configured as, for example, a volatile storage apparatus such as a RAM (random access memory) and provides the CPU 143 with a working area or the like.

The CPU 143 executes the computer program 142 stored in the storage apparatus 121 by reading the computer program 142 into the internal memory 141 or the like. By executing the computer program 142, the CPU 143 integrally controls the apparatus 102 itself and performs various determination, computation, and control processes.

Functions which the power interchange apparatus 102 is equipped with will be described. The functions described below can be considered functions that are implemented by having the CPU 143 execute the program 142. However, the functions of the apparatus 102 are not limited to cases where the functions are realized by the computer program 142 and may be realized by dedicated hardware apparatuses.

The apparatus 102 has a function of controlling the power converter 130. When the apparatus 102 receives data from the management server 101 or another apparatus 102 via the communication device control unit 140, the apparatus 102 controls the power converter 130 in accordance with a control instruction from the management server 101 or the other apparatus 102.

The apparatus 102 has a function of transmitting various types of data possessed by the apparatus 102 to the management server 101 or another apparatus 102 via the communication device control unit 140. The apparatus 102 has a function of acquiring, when necessary, information from the management server 101 or another apparatus 102 via the communication device control unit 140.

The apparatus 102 has a function of communicating with the power converter 130, controlling the power converter 130, acquiring a device status from the power converter 130, and the like via the communication device control unit 140. The apparatus 102 also has a function of acquiring information from the power converter 130 and the like and recording the acquired information. For example, the apparatus 102 acquires and records information regarding the power converter 130 such as a present state, control history, types of equipment 131 to 133 to which the power converter 130 is coupled, and power amounts of apparatuses 131 to 133 to which the power converter 130 is coupled. In addition, the apparatus 102 acquires and records information regarding a group to which the apparatus 102 belongs and information regarding other apparatuses 102 that are members of the same group. The power supply 131, the storage battery 132, and the load 133 are examples of "electrical equipment".

A hardware configuration of the power supply 131 is constituted by, for example, distributed power supply devices such as a photovoltaic panel or a wind power generator. The power supply 131 may have a function of communicating with the power converter 130a that is responsible for the power supply 131. The power supply 131 may have a function of starting or stopping supply of power in accordance with a request from the power converter 130a. The power supply 131 may have a function of transmitting a present status or an amount of flowing power to the power converter 130a. A configuration may be adopted in which the functions of the power supply 131 are implemented by the power converter 130a. The power converter 130a may be configured so as to be provided with at least a part of the functions of the power supply 131.

A hardware configuration of the battery 132 is constituted by, a storage battery such as a lead storage battery or a lithium ion storage battery. The storage battery 132 may have a function of communicating with the power converter 130b that is responsible for the storage battery 132. The storage battery 132 may have a function of charging or discharging power or stopping a charge or discharge in accordance with a request from the power converter 130b. The storage battery 132 may have a function of transmitting a present status or an amount of flowing power to the power converter 130b. The power converter 130b may be configured so as to be provided with at least a part of the functions of the storage battery 132.

The load 133 is constituted by, for example, an arbitrary electrical load such as a household electrical appliance or production equipment at a factory. The load 133 may have a function of communicating with the power converter 130c that is responsible for the load 133. The load 133 may have a function of consuming power or stopping power consumption in accordance with a request from the power converter 130c. The load 133 may have a function of transmitting a present status or an amount of flowing power to the power converter 130c. The power converter 130c may be configured so as to be provided with at least a part of the functions of the load 133.

The system power supply line 160 is constituted by, for example, a low-voltage distribution line, a high-voltage distribution line, or a self-owned line. The system power supply line 160 is coupled to the power converter 130d that is responsible for the system power supply line 160. Each power interchange apparatus 102 is coupled via the system power supply line 160 and is configured so as to be capable of power transfer.

The power converters 130a, 130b, 130c, and 130d are coupled to one another by the shared power line 135. By involving the shared power line 135, the respective power converters 130 can transfer power to one another. Therefore, power of the power supply 131, the storage battery 132, the load 133, and the system power supply line 160 which are coupled to the power converter 130 can be transferred inside the power interchange apparatus 102 through the power line 135. In addition, the power supply 131, the storage battery 132, and the load 133 which are under the management of a certain power interchange apparatus 102 can transfer power to other power interchange apparatuses 102 via the system power supply line 160 and the like. Moreover, transferring power between one apparatus and another apparatus may sometimes be expressed as supplying and receiving power between the respective apparatuses or performing power supply and reception between the respective apparatuses.

A hardware configuration of the management server 101 is as follows. Hereinafter, the management server 101 will be referred to as a server 101. The server 101 includes, for example, a communication device control unit 113, a storage apparatus 114, an internal memory 115, and a CPU 117.

The communication device control unit 113 is an example of a "communicating unit" and communicates with respective power interchange apparatuses 102 that are management targets via the communication network 150. The storage apparatus 114 is an example of a "storage unit" and is constituted by a non-volatile storage apparatus such as a hard disk drive or a flash memory device. The internal memory 115 is constituted by a volatile storage apparatus such as a RAM. The internal memory 115 stores a computer program 116 or data read from the storage apparatus 114. The internal memory 115 provides the CPU 117 with a working area.

The CPU 117 is an example of a "computing unit" and executes the program 116 stored in the storage apparatus 114 or the like by reading the program 116 into the internal memory 115 or the like to integrally control the server 101 itself and, at the same time, performs various determination, computation, and control processes (to be described later).

The storage apparatus 114 stores the computer program 116 as a "prescribed computer program" and various pieces of information 118, 119, and 120 for management. The computer program 116 is a program for implementing functions to be realized by the server 101 according to the present example.

Figure 8:
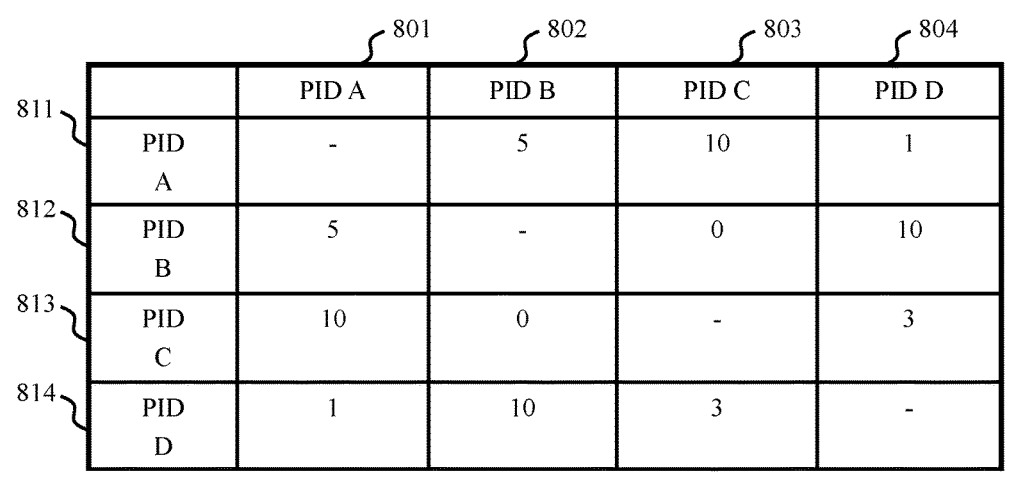

As information necessary for managing power interchange apparatuses 102 as a group, for example, at least a group database 118 that represents group information, an equipment management database 119 that represents equipment information, and a power amount information database 120 that represents power amount information are stored in the storage apparatus 114. Moreover, while not illustrated in FIG. 1, the server 101 also stores information related to physical coupling among the power interchange apparatuses 102 as shown in FIGS. 7, 8, and 9 (to be described later). Information related to physical coupling includes, for example, information related to a power transmission path that can be used to transmit power and information related to a power amount that can be sent along the power transmission path.

Although not illustrated, the server 101 can be provided with an information input-output apparatus. The information input-output apparatus includes an information input apparatus for inputting information to the server 101 and an information output apparatus for outputting information from the server 101. Examples of an information input apparatus include a pointing device such as a keyboard and a mouse, a touch panel, an audio input apparatus, and a motion detecting apparatus. Examples of an information output apparatus include a display, a printer, and an audio output apparatus. The information input-output apparatus may be configured as a peripheral device of the server 101 or an operator terminal may be used as the information input-output apparatus.

While FIG. 1 shows the server 101 as a single computer, this configuration is not limited and the server 101 may be configured by linking a plurality of physical computers. In addition, a configuration may be adopted in which a part of the functions to be realized by the server 101 is realized by one or a plurality of power interchange apparatuses among the power interchange apparatuses 102.

Next, functions which the server 101 is equipped with will be described. The functions described below are implemented by having the CPU 117 execute the program 116. Alternatively, at least a part of the functions of the server 101 may be realized from a dedicated hardware apparatus or the like.

The server 101 has a function of sending back necessary data in the storage apparatus 114 in accordance with a request instruction from the apparatus 102 when the server 101 receives data from the apparatus 102 via the communication device control unit 113. The server 101 has a function of acquiring various types of data possessed by the apparatus 102 via the communication device control unit 113. The server 101 has a function of controlling the apparatus 102 by transmitting a control instruction to the apparatus 102 via the communication device control unit 113.

The server 101 has a function of recording information (data) in the equipment management database 119 and the power amount information database 120 based on the conversion information 126, the equipment information 127, the transaction information 128, and the like acquired from the apparatus 102 and, when necessary, reading information (data) from the respective databases 119 and 120 and processing the information (data).

The server 101 has a function of calculating a power interchange group including one or more apparatuses 102 using data in the equipment management database 119 and the power amount information database 120. The server 101 has a function of recording a calculated power interchange group in the group database 118. In addition, the server 101 has a function of recalculating a power interchange group when necessary. As will be described in detail later, a power interchange group refers to a group for transferring power when necessary among the power interchange apparatuses 102 in the group. A power interchange group may also be abbreviated to a group.

The server 101 has a function of transmitting a group calculation result to the respective apparatuses 102 via the communication device control unit 113 and controlling power interchange in the group.

—Examples of Data Structures—

Next, examples of data structures of tables used by the server 101 and the power interchange apparatuses 102 will be described.

FIG. 2 shows an example of the group database 118 that is managed by the server 101. The group database 118 stores to which group each power interchange apparatus 102 belongs or to which group each power interchange apparatus 102 has belonged.

The group database 118 is constituted by data including names of groups 202, 203, and 204 to which the apparatuses 102 belong and periods 211, 212, and 213 which represent periods of group configurations. The server 101 can automatically generate and update the group database 118 based on equipment information and power amount information acquired from the respective apparatuses 102. Alternatively, a system manager may manually or semi-automatically generate and update the group database 118 by inputting data to the server 101. As a method of inputting data, data may be manually input using a keyboard or the like, transferred from a portable memory, or input via a communication network. The other databases described below may also be generated by any method in a similar manner to that described regarding the group database 118.

Moreover, the group database 118 may be configured so that only a latest group configuration is stored instead of managing history. By not storing a group configuration history, a size of the group database 118 can be reduced. When the number of apparatuses 102 that are management targets is large, a storage capacity of the storage apparatus 114 can be efficiently used by reducing the size of the database. The other databases described below may also be configured in a similar manner so that history is not managed.

Moreover, in a case of a database that manages history, group configurations or the like can be calculated based on the history, and there is a higher possibility of group calculations with higher accuracy being performed.

FIG. 3 shows an example of the equipment management database 119. The equipment management database 119 is managed by the server 101. The equipment management database 119 stores, for each period, a power transfer capability and a power consumption capability of the apparatuses 102.

For example, the equipment management database 119 stores, for each apparatus 102, a period 301, a maximum amount of generated power 302, a maximum amount of stored power 303, a maximum load amount 304, an installation location 305, and transfer feasibility 306. The period 301 is a period recorded by measuring each piece of data 302 to 306. As demonstrated by records 311, 312, and 313, for each apparatus 102, the equipment management database 119 respectively manages pieces of data 301 to 306 for each apparatus 102. The equipment management database 119 may be automatically generated based on the equipment information 127 and the transaction information 128 of the apparatuses 102 or may be created by the system manager.

FIG. 4 shows an example of the power amount information database 120. The power amount information database 120 is managed by the server 101. For example, the power amount information database 120 stores, for each period, equipment information of the system power supply line 160 and a power transfer capability and a power consumption capability of the apparatuses 102.

The power amount information database 120 stores, for each apparatus 102, a period 401, an amount of supplied power 402, an amount of received power 403, a cost for supplying power 404, and a cost for receiving power 405. The period 401 is a period recorded by measuring each piece of data 402 to 405. The amount of supplied power 402 is a power amount that can be supplied in a unit period. The amount of received power 403 is a power amount that can be received in a unit period.

The cost for supplying power 404 represents a cost required to supply power to other apparatuses 102. The cost for supplying power 404 includes, for example, a cost for using the system power supply line 160 in order to transfer power and a cost for introducing or operating the power supply 131.

The cost for receiving power 405 represents a cost required to receive power from other apparatuses 102. The cost for receiving power 405 includes, for example, a cost for using the system power supply line 160 in order to receive power and a cost for introducing or operating the storage battery 132 for storing received power. As demonstrated by records 411 and 412, the power amount information database 120 respectively manages pieces of data 401 to 405 for each apparatus 102. The power amount information database 120 may be automatically generated from the equipment information 127 and the transaction information 128 of the apparatuses 102 or may be created by the system manager.

—Processing Procedure Example 1—

An example of processing for controlling power interchange will be described. Various operations corresponding to a method of controlling the power interchange apparatuses 102 described below are realized by the program 142 that is respectively executed by the power interchange apparatuses 102 that constitute the system 100. In addition, the program 142 is constituted by codes for performing the various operations described below.

FIG. 5 is a flow chart showing a processing procedure example 1 of a method of controlling the server 101 and each power interchange apparatus 102 according to the present example. Main processes executed by the server 101 and each apparatus 102 will be described with reference to FIG. 5. For the sake of brevity, FIG. 5 shows apparatuses 102a to 102d which constitute a part of the power interchange apparatuses 102a to 102h shown in FIG. 1.

The server 101 and each apparatus 102 execute respective processes 503 to 528 in a loop from a process 501 to a process 502. First, the server 101 performs a process 503 for acquiring apparatus information. The server 101 transmits an information acquisition request 521 to each apparatus 102. Upon receiving the information acquisition request 521 from the server 101, each apparatus 102 transmits the conversion information 126, the equipment information 127, and the transaction information 128 to the server 101 as a response 522 to the information acquisition request 521.

The server 101 performs a process 504 for selecting a group. In the group selection process 504, the equipment management database 119 and the power amount information database 120 are respectively updated based on the conversion information 126, the equipment information 127, and the transaction information 128 obtained for each apparatus 102. The group selection process 504 selects apparatuses 102 to constitute a group and stores a result of the selection in the group database 118. Details of the group selection process 504 will be described later.

The server 101 executes a process 505 for transmitting grouping information to each apparatus 102. The group information transmission process 505 transmits a grouping control request 523 to the apparatuses 102 selected as group members. The grouping control request 523 is information requesting that specified apparatuses 102 configure a group and that power be interchanged in the group.

Upon receiving the grouping control request 523 from the server 101, each apparatus 102 updates the conversion information 126, the equipment information 127, and the transaction information 128 and transmits a response 524 to the grouping control request 523 to the server 101.

An example of a calculation result of the group selection process 504 will be described using the record 211 shown in FIG. 2. A group 1 shown in a field 202 is constituted by two apparatuses 102a and 102b. A group 2 shown in a field 203 is constituted by two apparatuses 102c and 102d. Moreover, basically, each apparatus 102 cannot join different groups at the same time.

Power interchanges 506, 507, 508, and 509 are performed between apparatuses configuring a group upon receiving the control request 523. Each apparatus 102 updates the conversion information 126, the equipment information 127, and the transaction information 128 as necessary.

The server 101 regularly or irregularly evaluates whether or not power interchange in each group is appropriate and reorganizes the group when necessary. The server 101 executes a process 510 for acquiring a result of power interchange. The server 101 transmits an acquisition request 525 for a power interchange result to each apparatus 102 in each group. Upon receiving the interchange result acquisition request 525 from the server 101, each apparatus 102 transmits the conversion information 126, the equipment information 127, and the transaction information 128 to the server 101 as a response 526 to the interchange result acquisition request 525.

The server 101 respectively updates the equipment management database 119 and the power amount information database 120 based on the conversion information 126, the equipment information 127, and the transaction information 128 of each apparatus 102. The server 101 checks a difference between a power interchange estimated in the group selection process 504 and an actual result and, when necessary, reorganizes the group by performing a group reselection process 511.

After once again selecting the apparatuses 102 constituting each group, the server 101 updates the group database 118. Details of the group reselection process 511 will be described later. An example of a result of recalculating a group configuration will be described with reference to the record 212 shown in FIG. 2. A group 1 shown in a field 202 is re-constituted by two apparatuses 102a and 102c and a group 2 shown in a field 203 is re-constituted by two apparatuses 102b and 102d.

The server 101 performs a process 512 for transmitting grouping information to each apparatus 102. The server 101 transmits a grouping control request 527 to each apparatus 102 in each group. Upon receiving the grouping control request 527 from the server 101, each apparatus 102 updates the conversion information 126, the equipment information 127, and the transaction information 128. Each apparatus 102 transmits a response 528 to the grouping control request 527 to the server 101. After the process 528 is finished, a return is made to the process 501 (502).

Details of the group selection process 504 and the group reselection process 511 will be described with reference to FIG. 6. FIG. 6 is a flow chart showing an example of a process for determining group members. The present process is executed by the server 101.

First, the server 101 determines whether or not a new apparatus 102 has been added to the system 100 (601). Examples of methods for finding out whether or not a new power interchange apparatus 102 has been added to the system 100 include a method in which a newly added apparatus 102 reports to the server 101 that the apparatus 102 has been newly added to the system 100, a method in which the server 101 regularly or irregularly inquires all apparatuses 102 under its management about their presence, and a method in which the system manager inputs the addition of the new apparatus 102 to the server 101. Any of these methods may be used.

When it is determined that a new apparatus 102 has been added to the system 100 (601: Yes), the server 101 performs a process for adding apparatus information (602). In the apparatus information addition process, the server 101 communicates with the new apparatus 102 and acquires the various types of information 126 to 128 of the new apparatus 102, and respectively updates the equipment management database 119 and the power amount information database 120.

Moreover, while a case where a new apparatus 102 is added to the system 100 has been described, this is not restrictive and information can be acquired from the respective apparatuses 102 in the system 100 and the databases 119 and 120 can be updated in a similar manner when a configuration of the system 100 changes. Examples of cases where the configuration of the system 100 changes include a case where an existing power interchange apparatus 102 is removed from the system 100 and a case where a power interchange apparatus 102 is replaced with a new apparatus 102. In addition to cases where the configuration of the system 100 changes, the server 101 can acquire information from the respective apparatuses 102 in the system 100 and update the databases 119 and 120 at arbitrary timings.

The server 101 determines whether or not a large group division is necessary as a first stage of a process for selecting a group of power interchange apparatuses 102 (603). A large group division refers to classifying, in advance, candidates of power interchange apparatuses that may potentially become group members before creating a group of power interchange apparatuses 102.

In the example shown in FIG. 1, there are eight power interchange apparatuses 102a to 102h. The eight apparatuses 102a to 102h are divided into several large groups based on division conditions configured in advance. For example, the apparatuses 102a, 102b, 102c, and 102d are classified into a first large group and the apparatuses 102e, 102f, 102g, and 102h are classified into a second large group. Subsequently, a group for interchanging power is created in each large group.

A determination of whether or not a large group division prior to group selection is necessary is made in accordance with prescribed division conditions configured in advance. Examples of prescribed division conditions include physical restrictions, legal restrictions, and restrictions related to performance.

Physical restrictions refer to cases where the respective apparatuses 102 in the system 100 must be classified in advance in order to satisfy physical conditions related to power interchange. As a first example of physical restrictions, there is a case where installation locations of the apparatuses 102 are physically separated over large distances and power cannot be interchanged even if the apparatuses 102 are grouped such as when the apparatuses 102 are respectively installed on remote islands. As a second example of physical restrictions, there is a case where a power transmission capability of the system power supply line 160 is insufficient. This is a case where a power transmission capacity of the system power supply line 160 is lower than a capacity necessary for a large number of apparatuses 102 to simultaneously perform power transfer.

In a configuration in which power is supplied by a power transmission and distribution pathway with a tree structure from a large upstream power generator to respective downstream consumers, in a case where power interchange is performed by bidirectionally transmitting power using a network of pathways, it is particularly important to determine whether or not the case corresponds to the second example described above. Whether or not a case corresponds to physical restrictions can be determined based on a value of the installation location 305 in the equipment management database 119.

Legal restrictions refer to cases where power interchange is not permitted by law or regulations. As first examples of legal restrictions, there is a case where power interchange between a given apparatus 102 and another apparatus 102 is not permitted by law or the like and a case where power cannot be interchanged between an installation location of a given apparatus 102 and an installation location of another apparatus 102 due to the installation locations being in different countries or regions. As a second example of legal restrictions, there is a case where power interchange is not permitted because a penalty is imposed on a given apparatus 102. For example, a penalty related to power interchange is imposed when payment of a service fee of the server 101 is delayed or when notifying the server 101 of false equipment information or false transaction information with respect to a power interchange apparatus 102. Whether or not a case corresponds to legal restrictions can be determined based on a value of transfer feasibility 306 in the equipment management database 119.

Restrictions related to performance refer to cases where division (classification) into large groups must be performed in consideration of processing performance of the server 101 or communication environment. As first examples of restrictions related to performance, there is a case where the number of apparatuses 102 that are processing targets is too large to constitute a group and a case where a group cannot be selected within a specified time due to a calculation time for obtaining computation results being too long. As second examples of restrictions related to performance, there is a case where communication between the server 101 and the respective apparatuses 102 cannot be performed within a prescribed time and a case where communication performance between the server 101 and the apparatuses 102 has declined and a group cannot be selected within a specified time. Whether or not a case corresponds to restrictions related to performance can be determined based on a log of calculation results or a communication log stored in the program 116.

When it is determined that a large group division is required (603: Yes), the server 101 performs a large group division process (604). When a case corresponds to any of the three types of restrictions discussed above based on stored contents of the equipment management database 119, the server 101 divides an inside of the system 100 into a plurality of large groups, calculates apparatuses 102 belonging to each large group, and records the calculated apparatuses 102 in the group database 118.

The server 101 performs a main process for selecting a group of power interchange apparatuses 102. First, the server 101 determines whether or not a group has been selected in accordance with all conditions configured in advance (605).

In this case, selecting a group in accordance with conditions refers to determining whether or not an apparatus 102 that is a candidate for a group member satisfies prescribed conditions and retaining the apparatus 102 when the conditions are satisfied. Selecting a group in accordance with all conditions refers to retaining an apparatus 102 that satisfies all prescribed conditions as a member of a group.

The prescribed conditions for selecting an apparatus 102 to belong to a group may be configured by the system manager or may be configured based on the equipment information 127 of the apparatus 102 or contents recorded in the equipment management database 119 of the server 101. An example of a selection based on conditions will be described in detail in a processing procedure example 2.

When selection of a group based on all conditions is finished (605: Yes), the server 101 notifies the respective apparatuses 102 selected as a member of each group of group information including information identifying a group to which the apparatuses 102 belong and causes power interchange control to be started in the group (607).

Group information includes, for example, group identification information for identifying a group and apparatus identification information for identifying other apparatuses 102 that belong to the group. After transmitting the group information to each apparatus 102 in a group, the server 101 instructs power interchange to be executed among the apparatuses in the group.

When selection of a group based on all prescribed conditions is not finished (605: No), the server 101 selects a group in stages based on respective conditions (606). The process 606 can be described as a process of dividing groups based on the respective conditions.

The server 101 performs a three-stage process. Firstly, combinations of all apparatuses 102 that are group potential candidates are calculated. Secondly, a group in which power interchange based on a given condition can be performed is selected from the calculated group candidates. Thirdly, whether or not power interchange is physically executable in the group selected based on the condition is checked and, if not executable, the group is excluded from the group candidates. Details of the process 606 will be described later in the processing procedure example 2.

The server 101 determines whether or not group selection must be performed once again (608). Whether or not group selection must be performed once again is determined based on a past record of power interchange in the group. When a past record (past results) of power interchange significantly deviates from planned conditions (608: Yes), the server 101 reselects a group (609). A selection of conditions will be described later. When group selection need not be performed once again (608: No), the server 101 checks whether or not a prescribed time has elapsed (610). When the prescribed time has not elapsed (610: No), the server 101 controls power interchange in an existing group and checks whether or not group selection must be performed once again (608).

When the prescribed time has elapsed (610: Yes), the server 101 determines whether or not a new apparatus 102 has been added to the system 100 (601). The prescribed time is, for example, a week or a month. The processing shown in FIG. 6 is executed each time the prescribed time elapses.

Since a division into large groups is performed and groups of the apparatuses 102 are recalculated in units of the large groups, the prescribed time is set so as to have a certain length. For example, the prescribed time maybe configured to have a value representing a long time during a period with small power fluctuations such as spring and fall and may be configured to have a value representing a short time during a period with large power fluctuations such as summer and winter.

—Processing Procedure Example 2—

Group selection (606) based on conditions will now be described with reference to FIGS. 7, 8, 9, and 10.

FIG. 7 schematically shows an example of a physical coupling configuration of a power interchange network. The power interchange network is constituted by four power interchange apparatuses including a power interchange apparatus 102 (A), a power interchange apparatus 102 (B), a power interchange apparatus 102 (C), and a power interchange apparatus 102 (D). In FIGS. 7 to 10, reference signs that differ from those shown in FIG. 1 will be used in order to describe conditions for performing power interchange between power interchange apparatuses. Contents described with reference to FIGS. 7 to 10 are not limited to the configuration shown in FIG. 1.

The respective apparatuses 102 (A) to 102 (D) are coupled by power transmission lines capable of transmitting power. The apparatus 102 (A) and the apparatus 102 (B) are coupled by a power transmission line 712. The apparatus 102 (A) and the apparatus 102 (C) are coupled by a power transmission line 711. The apparatus 102 (A) and the apparatus 102 (D) are coupled by a power transmission line 715. The apparatus 102 (B) and the apparatus 102 (D) are coupled by a power transmission line 713. The apparatus 102 (C) and the apparatus 102 (D) are coupled by a power transmission line 714. The respective apparatuses 102 (A) to 102 (D) are capable of transmitting power to one another via the power transmission lines. These power transmission lines may be either physical entities or logical entities. In either case, power need only be transmittable among the apparatuses.

FIG. 8 shows an example of capacities of power transmittable by the power transmission lines 711 to 715 of the power interchange network shown in FIG. 7. A capacity of each power transmission line can be calculated based on, for example, the conversion information 126, the equipment information 127, and the transaction information 128. A result of the calculation is stored in, for example, the equipment management database 119 of the server 101.

As shown in columns 802, 803, and 804, the apparatus 102 (A) shown in a row 811 is capable of transmitting power to the apparatus 102 (B), the apparatus 102 (C), and the apparatus 102 (D) 804, and capacities of transmittable power are "5" to the apparatus 102 (B), "10" to the apparatus 102 (C), and "1" to the apparatus 102 (D).

As shown in columns 801, 803, and 804, the apparatus 102 (B) shown in a row 812 is capable of transmitting power to the apparatus 102 (A), the apparatus 102 (C), and the apparatus 102 (D), and capacities of transmittable power are "5" to the apparatus 102 (A), "0" to the apparatus 102 (C), and "10" to the apparatus 102 (D).

As shown in columns 801, 802, and 804, the apparatus 102 (C) shown in a row 813 is capable of transmitting power to the apparatus 102 (A), the apparatus 102 (B), and the apparatus 102 (D), and capacities of transmittable power are "10" to the apparatus 102 (A), "0" to the apparatus 102 (B), and "3" to the apparatus 102 (D).

As shown in columns 801, 802, and 803, the apparatus 102 (D) shown in a row 814 is capable of transmitting power to the apparatus 102 (A), the apparatus 102 (B), and the apparatus 102 (C), and capacities of transmittable power are "1" to the apparatus 102 (A), "10" to the apparatus 102 (B), and "3" to the apparatus 102 (C).

As described above, in the power interchange network shown in FIG. 7, the apparatus 102 (A) and the apparatus 102 (B) can transmit a transmitted power amount of "5" to each other. The apparatus 102 (A) and the apparatus 102 (C) can transmit a transmitted power amount of "10" to each other. The apparatus 102 (A) and the apparatus 102 (D) can transmit a transmitted power amount of "1" to each other. The apparatus 102 (B) and the apparatus 102 (D) can transmit a transmitted power amount of "10" to each other. The apparatus 102 (C) and the apparatus 102 (D) can transmit a transmitted power amount of "3" to each other.

FIG. 9 shows an example of equipment information possessed by the apparatuses 102 (A) to 102 (D) of the power interchange network shown in FIG. 7. The information shown in FIG. 9 can be created based on the conversion information 126, the equipment information 127, and the transaction information 128, and a created result can be stored in, for example, the equipment management database 119 of the server 101.

Respective rows 911, 912, 913, and 914 correspond to the apparatus 102 (A), the apparatus 102 (B), the apparatus 102 (C), and the apparatus 102 (D). FIG. 9 shows an amount of generated power 901, an amount of stored power 902, a load amount 903, a basic interchange amount 904, and a maximum interchange amount 905 for each of the apparatuses 102 (A) to 102 (D).

The amount of generated power 901 refers to an amount of generated power that can be generated by a target apparatus in a given unit time. The amount of stored power 902 refers to an amount of stored power that can be stored by a target apparatus in a given unit time. In the present example, an amount of stored power and an amount of discharged power will be described as being equal to each other for the sake of brevity.

The load amount 903 refers to an amount of power that is consumed by a target apparatus in a given unit time. The basic interchange amount 904 refers to an amount of power that can be transmitted by a target apparatus to another apparatus in a given unit time. A positive value of the basic interchange amount 904 indicates that power can be transmitted and a negative value indicates that power must be received.

The maximum interchange amount 905 refers to a maximum amount of power that can be transmitted by a target apparatus to another apparatus in a given unit time, and differs from the basic interchange amount 904 in that, for the maximum interchange amount 905, all of the amount of stored power is discharged and used for power interchange.

FIG. 10 shows how many groups can be created when the system 100 has a total of four apparatuses including the apparatus 102 (A), the apparatus 102 (B), the apparatus 102 (C), and the apparatus 102 (D) as shown in FIG. 7.

The present processing can be processed as a combination problem. Since there are four power interchange apparatuses, a total of 15 combinations from a pattern 1 (1011) to a pattern 15 (1025) exist. For each combination, a group 1 (1001), a group 2 (1002), a group 3 (1003), and a group 4 (1004) can be generated. Some groups have no member apparatuses while other includes all apparatuses as members.

FIG. 11 shows an example of selecting an appropriate group based on conditions from the patterns shown in FIG. 10. The table shown in FIG. 11 can be created based on, for example, the conversion information 126, the equipment information 127, and the transaction information 128, and a created result can be stored in, for example, the group database 118 of the server 101.

FIG. 11 has a pattern 1 (1111) to a pattern 15 (1126) in a similar manner to FIG. 10. In an initial state (1101), all of the patterns are "valid".

In this case, based on a total of four conditions from a condition 1 (1102) to a condition 4 (1105), valid patterns are selected from the respective patterns from the pattern 1 (1111) to the pattern 15 (1126).

The condition 1 (1102) represents a selection based on physical interchange feasibility (1131). The condition 2 (1103) represents a selection based on stable supply feasibility (1104). The condition 3 (1104) represents a selection based on interconnection line capacity determination (1133). The condition 4 (1105) represents a selection based on smoothed device use (1134).

First, a selection based on physical interchange feasibility (1131) which is represented by the condition 1 (1102) will be described. A selection based on physical interchange feasibility refers to extracting patterns which physically enable power transmission. Based on physical transmittable power amounts of the respective apparatus 102 (A), the apparatus 102 (B), the apparatus 102 (C), and the apparatus 102 (D) shown in FIG. 8, patterns that are physically incapable of transmitting power are detected and the patterns incapable of transmitting power are excluded.

According to FIG. 8, the apparatus 102 (B) and the apparatus 102 (C) are incapable of transmitting power to each other. Therefore, among the patterns 1 to 15 in FIG. 10, the patterns 10 and 12 which include a group that is only constituted by the apparatus 102 (B) and the apparatus 102 (C) are considered to be invalid. In FIG. 11, since the pattern 10 (1121) and the pattern 12 do not satisfy the condition 1 (1102), the patterns are considered invalid.

A selection based on stable supply feasibility (1132) which is represented by the condition 2 (1103) will be described. A selection based on stable supply feasibility refers to extracting patterns which are capable of at least maintaining a power interchange amount of "0" in a group.

The present condition is prepared so that power interchange apparatuses can always supply power in a stable manner. In other words, when power consumption by the load 133 under management of one apparatus cannot be covered, giving power from the one apparatus to another apparatus causes a power interchange amount to take a negative value and a power failure may occur under the management of the one apparatus.

According to FIG. 9, since the apparatus 102 (C) has a negative interchange amount, a group solely constituted by the apparatus 102 (C) is unable to realize stable supply of power. Therefore, in this case, in FIG. 11, the pattern 4 (1115), the pattern 7 (1118), the pattern 11 (1122), the pattern 13 (1124), and the pattern 15 (1126) are considered "invalid".

A selection based on interconnection line capacity determination (1133) which is represented by the condition 3 (1104) will be described. A selection based on a determination of a capacity of an interconnection line refers to extracting patterns which are not subjected to a restriction on power transmission capacity of a power transmission line (an interconnection line) which couples apparatuses to each other.

As described with reference to FIG. 8, the server 101 is aware of a transmittable power capacity among the respective apparatuses. FIG. 9 reveals that power must be supplied to the apparatus 102 (C) for which both interchange amounts 904 and 906 have negative values.

In consideration thereof, in FIG. 11, the pattern 2 (1113) is considered "invalid". Three apparatuses 102 (B), 102 (C), and 102 (D) belong to the group 2 of the pattern 2. However, as shown in FIG. 8, although the apparatus 102 (D) alone is capable of supplying power to the apparatus 102 (C), a transmittable power amount thereof is only "3". As shown in FIG. 9, since the power interchange amount of the apparatus 102 (C) is "−8" and "−4", even if a power amount of "3" is transmitted from the apparatus 102 (D) to the apparatus 102 (C), a value of the power interchange amount of the apparatus 102 (C) remains negative. Therefore, the pattern 2 is considered "invalid".

The pattern 6 (1117) is also considered "invalid" due to similar reasons as above. Although the apparatus 102 (C) and the apparatus 102 (D) belong to the group 2 of the pattern 6, the apparatus 102 (D) alone is capable of supplying power to the apparatus 102 (C). However, since the transmittable power amount from the apparatus 102 (D) to the apparatus 102 (C) is only "3", a value of the power interchange amount of the apparatus 102 (C) remains negative even if power is transmitted from the apparatus 102 (D) to the apparatus 102 (C). Since the group 1 of the pattern 14 (1125) has similar reasons, the pattern 14 is considered "invalid".

A selection based on smoothed device use (1134) which is represented by the condition 4 (1105) will be described. A selection based on smoothed device use refers to extracting patterns which enable as many power interchange apparatuses as possible to use the power supply 131 and the storage battery 132 instead of only using the power supply 131 and the storage battery 132 under management of a specific power interchange apparatus.

In FIG. 11, the pattern 5 (1116) is considered "invalid". As shown in FIG. 10, in the group 1 of the pattern 5, the apparatus 102 (D) performs power interchange by itself. The apparatus 102 (D) can cover a power demand by the apparatus 102 (D) by discharging power stored in the storage battery 132 under the management of the apparatus 102 (D) and can achieve a balance. As a result, there is a risk that only the storage battery 132 of the apparatus 102 (D) is excessively used and may result in reducing product life or degrading performance of the storage battery 132. Due to similar reasons, the pattern 7 (1118), the pattern 9 (1120), the pattern 12 (1123), and the pattern 15 (1126) are also considered "invalid". In addition, other patterns having groups constituted by a single apparatus are incapable of smoothing device use and are therefore considered "invalid".

The patterns satisfying all of the four conditions described above are three patterns including the pattern 1 (1112), the pattern 3 (1114), and the pattern 8 (1119) shown in FIG. 11 and, accordingly, these patterns are retained as final candidates. A group may be generated by selecting an arbitrary pattern from the patterns that are final candidates. A pattern may be randomly selected using a random number or may be selected using a formula to be described later.

FIG. 12 shows examples of a screen representing a result of a group calculation. A screen display example 1201 in FIG. 12 (*a*) represents an example displaying a group calculation result according to the pattern 1. A screen display example 1202 in FIG. 12 (*b*) represents an example displaying a group calculation result according to the pattern 8.

—Processing Procedure Example 3—

An example of a process (609) of once again selecting a group based on a power interchange result (an actual value of power interchange) will be described. In the present example, after selecting a group, determination criteria below are provided with respect to a power interchange amount.

Using an amount of generated power A per unit time, an amount of stored power B per unit time, and usage C per unit time, a value P obtained by subtracting the usage C from a sum of the amount of generated power A and the amount of stored power B is to be used as the determination criteria (P=A+B−C).

The amount of generated power A can be defined as a product of a time function f(t) and a prescribed weight coefficient α(A=α×f(t)). A total amount of generated power changes with time. The amount of stored power B can be defined as a product of a time function g(t) and a prescribed weight coefficient β(B=β×g(t)). A total amount of stored power changes with time. The usage C can be defined as a product of a time function h(t) and a prescribed weight coefficient γ(C=γ×h(t)). Total usage changes with time.

A value of the determination criteria P of 0 (P=0) indicates that power interchange has been performed with an optimal balance among power generation, power storage, and load.

When determining a necessity of reselecting a group, satisfaction is defined. Satisfaction is defined as a virtual price per unit power. Satisfaction can be calculated by respectively assigning prices to a calculated power amount and a consumed power amount.

The present example seeks to improve power interchange by basically considering power interchange as transfer of money among apparatuses. In this case, satisfaction is set to a numerical value ranging from +2 to −2. The following five numerical values are to be considered.

(1) When A+B−C=0, satisfaction is set to a maximum value of +2. (2) When P (maximum)>A+B−C>0, since an amount of supplied power is large but efficiency is low, satisfaction is set to a relatively high value of +1. Alternatively, satisfaction may be set to a standard value of 0. (3) When A+B−C>P (maximum), since supply is excessive, satisfaction is set to a relatively low value of −1. (4) When P (minimum)<A+B−C<0, since demand for power is high, satisfaction is set to a relatively low value of −1. (5) When A+B−C<P (minimum), since demand is excessive, satisfaction is set to a lowest value of −2. Based on the values of satisfaction described above, the server 101 can determine whether or not a group must be reselected.

When reselecting a group, a group of a pattern not yet selected among the pattern 1, the pattern 3, and the pattern 8 which are final candidates selected in FIG. 11 may be selected as a new group. Since patterns remaining as final candidates obviously satisfy the four conditions described earlier, a time required to reselect a group can be reduced. As alternatives to the above, a group may be selected anew by changing conditions or the group selection process may be performed once again after updating the equipment management database 119 and the power amount information database 120.

According to the present example, when executing power interchange, a group including a plurality of power interchange apparatuses can be created based on arbitrary conditions and power interchange in the group can be controlled.

The description of the present specification at least clarifies the following points. Specifically, for each selection of a group based on the conditions described above, physical restrictions, legal restrictions, restrictions related to performance or the like may be applied in a similar manner as described with respect to large group division.

In particular, characteristics of distributed power supplies may be taken into consideration as physical restrictions. For example, since output of distributed power supplies such as a photovoltaic power generation apparatus or a wind power generation apparatus fluctuate depending on an amount of sunlight or on wind direction, in order to secure astable supply of power, such distributed power supplies may be removed from group candidates even if a power interchange amount is satisfied.

Characteristics of a storage battery may also be taken into consideration as physical restrictions. With storage batteries, for example, discharge rates differ between a lithium storage battery and a lead storage battery. In consideration thereof, in order to secure a stable supply of power, storage batteries that are not satisfactory from the perspective of discharge rate may be removed from group candidates even if a power interchange amount is satisfied.

Satisfaction defined as an evaluation index of group reselection may be added to the conditions described above. In this case, a group may be selected so that satisfaction is always high.

A policy of a user who uses a power interchange apparatus or a policy of a system manager maybe added to the conditions described above. For example, an index called QoL (quality of life) is defined as a policy of a user or a manager. QoL is expressed by an objective function made up of a plurality of indices (QoL=A×f(x)+B×g(y)+ . . . +Z×a (z)), where A, B, . . . Z denote weight coefficients and each index is linearly independent. Each index is expressed by a product of a weight coefficient and a function. Examples of indices include "like-dislike" and "many-few".

One index, "like-dislike", can be expressed as "like-dislike"="constraint"+"individual difference (weight coefficient)"×"experience (index)". An "experience" can be calculated from the transaction information 128 and the equipment information 127 of an apparatus 102. A typical example of "like-dislike" is temperature, in which case a pleasant or an unpleasant feeling based on the temperature can be used as a determining factor for group division.

Another index, "many-few", can be expressed as "many-few"="constraint (such as an interchangeable range)" +"operation rate (weight coefficient)"×"assets (index)". An "operation rate" fluctuates in relation to the transaction information 128 of an apparatus 102. "Assets" refer to "a maximum amount of generated power or stored power" and can be calculated from the equipment information 127 or the conversion information 126 of the apparatus 102. "Aging of a device" can also be expressed by the present formula. Atypical example of "many-few" is money, in which case a gain or a loss based on money can be used as a determining factor for group division.

While the group selection method described with reference to FIG. 11 selects a group in an order of physical interchange feasibility (1131), stable supply feasibility (1132), interconnection line capacity determination (1133), and smoothed device use (1134), this order may be changed.

In addition, a priority may be configured for each condition depending on the situation and group selection maybe performed in an order starting with a condition with a highest priority. For example, a group that prioritizes a transaction amount over a stable supply may be selected when a consumer is a general household and a group that prioritizes a stable supply over a transaction amount may be selected when a consumer is a factory.

While patterns not satisfying the conditions are considered to be "invalid" in the group selection described above, a configuration may be adopted in which an amount of fluctuation when an amount of generated power, an amount of stored power, or a load amount fluctuates can be absorbed by configuring the number of members of each group to a large number.

—Processing Procedure Example 4—

Details of control (607) of power interchange will be described with reference to FIGS. 13, 14, and 15. FIG. 13 is a flow chart showing an example of a power interchange control process by the server 101. In power interchange control, a power amount necessary for performing power interchange control itself is considered separately from power amounts that are naturally transmitted and received in the power interchange. In the present example, power necessary for executing power interchange control will be referred to as control basic power and a power amount thereof will be referred to as an amount of control basic power. Control basic power is an example of "control power".

For example, an amount of control basic power may include a power amount necessary for controlling the power converter 130 and a power amount necessary for maintaining direct current voltage in a case where the power line 135 is a direct current bus.

In the processing shown in FIG. 13, a power interchange apparatus that gives power may be referred to as a power transmitting apparatus and a power interchange apparatus that receives power may be referred to as a power receiving apparatus.

The server 101 checks whether or not a power transmitting-side apparatus 102 has control basic power (1301). When it is determined that the power transmitting-side apparatus 102 does not have control basic power (1301: No), the server 101 notifies the system manager or the like that it is difficult to supply power from the power transmitting-side apparatus 102 to a power receiving-side apparatus 102 (1302) and ends the present process.

An example of a case where the power transmitting-side apparatus 102 does not have control basic power is a case where a power transmitting-side power interchange apparatus does not have a power amount necessary for the power converters 130 under its management to control transmission and reception of power between the power converters 130. Another example is a case where, although there is a power amount necessary for controlling transmission and reception of power between the power converters 130, a power amount necessary to transmit power of the power supply 131 or the storage battery 132 to the outside is not available.

More specifically, examples include a case where the power transmitting-side apparatus 102 does not have the power supply 131 for supplying control basic power, a case where control basic power cannot be supplied due to a low remaining charge (state of charge: SOC) of the storage battery 132, and a case where, due to the load 133 being large, power that should be used as control basic power ends up being consumed by the load 133.

When the server 101 determines that the power transmitting-side apparatus 102 has control basic power (1301: Yes), the server 101 checks whether or not the power receiving-side apparatus 102 has control basic power (1303).

When it is determined that the power receiving-side apparatus 102 has control basic power (1303: Yes), the server 101 permits power transmission from the power transmitting-side apparatus 102 to the power receiving-side apparatus 102 and causes the power transmission to be executed (1306).

On the other hand, when it is determined that the power receiving-side apparatus 102 does not have control basic power (1303: No), the server 101 calculates an amount of control basic power to be transmitted to the power receiving-side apparatus 102 (1304). The server 101 causes control basic power required by the power receiving-side apparatus 102 to be transmitted from the power transmitting-side apparatus 102 to the power receiving-side apparatus 102 (1305). Subsequently, the server 101 permits power transmission from the power transmitting-side apparatus 102 to the power receiving-side apparatus 102 and causes the power transmission to be executed (1306).

FIG. 14 is an explanatory diagram of a case where power interchange control is performed by taking control basic power into consideration. In FIG. 14, the power interchange apparatus 102 (A) is a power transmitting-side apparatus and the power interchange apparatus 102 (C) is a power receiving-side apparatus.

The power transmitting-side power interchange apparatus 102 (A) includes a power converter 130 (A1) that controls the power supply 131, a power converter 130 (A2) that controls the storage battery 132, a power converter 130 (A3) that controls the load 133, and a power converter 130 (A4) that transmits and receives power using a self-owned line 161. The respective power converters 130 (A1) to 130 (A4) are coupled to the shared power line 135 and are capable of transferring power in the power interchange apparatus 102 (A) via the power line 135. In addition, the power interchange apparatus 102 (A) is capable of power transfer to and from the other power interchange apparatus 102 (C) via the power converter 130 (A4) and the self-owned line 161.

The power receiving-side power interchange apparatus 102 (C) includes a power converter 130 (C1) that controls the storage battery 132, a power converter 130 (C2) that controls the load 133, and a power converter 130 (C3) that transmits and receives power using the self-owned line 161. In a similar manner to the description given above, the respective power converters 130 (C1) to 130 (C3) are coupled to the shared power line 135 and are capable of transferring power in the power interchange apparatus 102 (C) via the power line 135. In addition, the power interchange apparatus 102 (C) is capable of power transfer to and from the other power interchange apparatus 102 (A) via the power converter 130 (C3) and the self-owned line 161.

In the present example, an example of a case where power is transmitted from the power supply 131 of the power interchange apparatus 102 (A) to the storage battery 132 of the power interchange apparatus 102 (C) will be described.

First, a presence or an absence of control basic power of the power transmitting-side power interchange apparatus 102 (A) is checked. In this case, it is assumed that the control basic power can be secured due to the storage battery 132 of the power interchange apparatus 102 (A). Therefore, the power interchange apparatus 102 (A) secures the control basic power by controlling the power converter 130 (A2).

Next, a presence or an absence of control basic power of the power receiving-side power interchange apparatus 102

(C) is checked. It is assumed that the control basic power can be secured due to discharging of the storage battery 132. However, an object of the present example is to charge the storage battery 132 of the power interchange apparatus 102 (C). Since the storage battery 132 of the power interchange apparatus 102 (C) cannot be discharged and charged at the same time, it is determined that the receiving-side power interchange apparatus 102 (C) does not have control basic power.

In this case, prior to supplying power from the transmitting-side power interchange apparatus 102 (A) to the receiving-side power interchange apparatus 102 (C), control basic power must be supplied from the apparatus 102 (A) to the apparatus 102 (C).

To this end, by controlling the power converters 130 (A1) and 130 (A4) of the power transmitting-side apparatus 102 (A) and the power converters 130 (C1) and 130 (C3) of the power receiving-side apparatus 102 (C), power of the power transmitting-side power supply 131 is supplied to the power receiving-side apparatus 102 (C) via the self-owned power line 161. As a result, the power interchange apparatus 102 (C) secures an amount of control basic power.

Basic conditions for interchanging power are satisfied when the power transmitting-side apparatus 102 (A) and the power receiving-side apparatus 102 (C) respectively have control basic power. At this point, by controlling the power converters 130 (A1) and 130 (A4) of the power transmitting-side apparatus 102 (A) and the power converters 130 (C1) and 130 (C3) of the power receiving-side apparatus 102 (C), power generated by the power transmitting-side power supply 131 is supplied to the power receiving-side storage battery 132.

FIG. 15 shows an example where the device configuration and the control procedure described above are displayed on a screen. In a screen display example 1501, a configuration diagram of control devices is displayed on an upper side while processing procedures are displayed below the configuration diagram. Display positions are not limited. The configuration diagram and the processing procedures may be respectively displayed in separate windows.

While a presence or an absence of control basic power is determined after selecting a group in the present example, alternatively, a presence or an absence of control basic power may be determined when selecting a group.

According to the present example configured as described above, since a group including a plurality of appropriate power interchange apparatuses 102 satisfying conditions can be created and power can be interchanged in the group, usability is improved.

In addition, in the present example, prior to performing power interchange in a group, a determination is made on whether or not a power transmitting-side apparatus 102 and a power receiving-side apparatus 102 have control basic power necessary for executing power interchange control. Therefore, an occurrence of a situation such as where power interchange cannot be started due to a lack of prerequisites necessary for actually performing power interchange control can be suppressed even when external conditions such as appropriateness of power transmission capacity are met. Therefore, usability is further improved.

In the present example, when the power receiving-side apparatus 102 does not have control basic power, control basic power is first transmitted from the power transmitting-side apparatus 102. Therefore, since preparation of the power receiving-side apparatus 102 can be automatically made, usability is improved.

The present invention is not limited to the examples described above. Various additions, modifications, and the like of the present invention will occur to those skilled in the art without departing from the scope of the invention. For example, the technical features of the present invention described above may be appropriately combined and implemented.

REFERENCE SIGNS LIST

100 Power interchange network system
101 Management server
102 Power interchanging apparatus
130 Power converter
135 Power line
160 System power supply line

The invention claimed is:

1. A power interchange management system which manages power interchange, the power interchange management system comprising:
    a communication unit;
    a storage unit; and
    a computing unit that is coupled to the communication unit and the storage unit,
    wherein the communication unit is coupled, via a communication network, to a plurality of power interchange apparatuses, each of which manages electrical equipment and controls a power supply-demand state of said managed electrical equipment, and
    wherein the respective power interchange apparatuses are electrically coupled pairwise to one another via a plurality of system power supply lines, each system power supply line coupling a pair of power interchange apparatuses,
    wherein the prescribed conditions comprise a condition related to control power,
    wherein the condition related to control power indicates that, among the plurality of prescribed power interchange apparatuses included in the group, a first power interchange apparatus on a power transmitting side in the group has power for power transmission control necessary for transmitting power and, at the same time, a second power interchange apparatus on a power receiving side in the group has power for power reception control necessary for receiving power and
    wherein the computing unit is configured to execute a prescribed computer program to:
        acquire prescribed information from each power interchange apparatus via the communication unit;
        store each piece of acquired prescribed information in the storage unit; and
        create a group for interchanging power by selecting a plurality of prescribed power interchange apparatuses from the respective power interchange apparatuses based on the prescribed information stored in the storage unit.

2. The power interchange management system according to claim 1,
    wherein the prescribed information comprises first configuration information related to a configuration of each power interchange apparatus, second configuration information related to electric coupling among the respective power interchange apparatuses, and power supply-demand state information related to a power supply-demand state of each power interchange apparatus, and wherein the computing unit is configured to select a plurality of the prescribed power interchange apparatuses and form the group based on the first and second configuration information, the power supply-demand state information and on prescribed conditions that are configured prior to creation of said group for interchanging power.

3. The power interchange management system according to claim 1,
wherein when determining that the second power interchange apparatus does not have the power for power reception control, the computing unit is configured to cause the power for power reception control to be transmitted first from the first power interchange apparatus to the second power interchange apparatus such that the second power interchange apparatus possesses the power for power reception control.

4. The power interchange management system according to claim 1,
wherein when determining that the first power interchange apparatus does not have the power for power transmission control, the computing unit is configured to present a system manager with information indicating that power cannot be transmitted from the first power interchange apparatus to the second power interchange apparatus.

5. The power interchange management system according to claim 1,
wherein after creating the group, the computing unit is configured to:
determine whether or not reorganization of the group is necessary based on a power interchange state in the group and a prescribed evaluation index, and to once again create the group when determining that reorganization of the group is necessary.

6. The power interchange management system according to claim 4,
wherein the computing unit is configured to present the system manager with information related to the created group.

7. The power interchange management system according to claim 1,
wherein the prescribed conditions further comprises: at least one of a stability condition requiring that stable power interchange equal to or larger than a prescribed value be performed between the respective prescribed power interchange apparatuses, a capacity condition requiring that a power amount to be interchanged between the respective prescribed power interchange apparatuses is equal to or less than a capacity of a power transmission line that couples the respective prescribed power interchange apparatuses to each other, and a smoothing condition requiring smoothing of use of the electrical equipment managed by the respective prescribed power interchange apparatuses.

8. The power interchange management system according to claim 1,
wherein the power interchange apparatus comprises a power conversion apparatus configured to convert power between the electrical equipment and a shared power line under management of the power interchange apparatus, and a power conversion apparatus configured to convert power between the shared power line and the system power supply line.

9. A power interchange management method for managing power interchange using a management apparatus, the management apparatus being coupled via a communication network to a plurality of power interchange apparatuses each managing electrical equipment and controlling a power supply-demand state of said managed electrical equipment, and the respective power interchange apparatuses being electrically coupled pairwise to each other via a plurality of system power supply lines, each system power supply line coupling one pair of power interchange apparatuses, the power interchange management method causing the management apparatus to:
acquire prescribed information from each power interchange apparatus;
store each piece of acquired prescribed information;
select a plurality of prescribed power interchange apparatuses from the respective power interchange apparatuses based on the prescribed information; and
create a group for interchanging power with the respective selected prescribed power interchange apparatuses,
wherein the prescribed conditions comprise a condition related to control power,
wherein the condition related to control power indicates that, among the plurality of prescribed power interchange apparatuses included in the group, a first power interchange apparatus on a power transmitting side in the group has power for power transmission control necessary for transmitting power and, at the same time, a second power interchange apparatus on a power receiving side in the group has power for power reception control necessary for receiving power.

10. The power interchange management method according to claim 9,
wherein the prescribed information comprises first configuration information related to a configuration of each power interchange apparatus, second configuration information related to electric coupling among the respective power interchange apparatuses, and power supply-demand state information related to a power supply-demand state of each power interchange apparatus, and
wherein the management apparatus is configured to:
select the prescribed power interchange apparatuses, and form the group based on the first and second configuration information, the power supply-demand state information, and prescribed conditions that are configured prior to creation of said group for interchanging power.

11. The power interchange management method according to claim 9,
wherein when determining that the second power interchange apparatus does not have the power for power reception control, the management apparatus is configured to cause the power for power reception control to be transmitted first from the first power interchange apparatus to the second power interchange apparatus such that the second power interchange apparatus possesses the power for power reception control.

* * * * *